Oct. 20, 1942.     D. E. REED     2,299,280
CLAMP DEVICE
Filed Aug. 15, 1941     3 Sheets-Sheet 1

INVENTOR:
DANIEL E. REED
BY Feyrer and Mack
ATTORNEYS.

Oct. 20, 1942.    D. E. REED    2,299,280
CLAMP DEVICE
Filed Aug. 15, 1941    3 Sheets-Sheet 2

INVENTOR:
DANIEL E. REED
BY Feyrer and Mack
ATTORNEYS.

Oct. 20, 1942.  D. E. REED  2,299,280
CLAMP DEVICE
Filed Aug. 15, 1941  3 Sheets-Sheet 3

INVENTOR
DANIEL E. REED
BY Feyrer and Mack
ATTORNEYS.

Patented Oct. 20, 1942

2,299,280

UNITED STATES PATENT OFFICE 2,299,280

CLAMP DEVICE

Daniel E. Reed, Norwalk, Conn., assignor to Yankee Metal Products Corp., Norwalk, Conn., a corporation of New York Application August 15, 1941, Serial No. 407,039

15 Claims. (Cl. 248—226)

This invention relates to clamp devices, particularly to clamp devices adapted for mounting articles such as automobile accessories on a vehicle, especially on a door flange thereof.

Clamp devices designed particularly for mounting rearview mirrors, reflectors, spotlights and other automobile accessories on the door flange and other suitable parts of a vehicle have been developed and used commercially for an appreciable period of time. However, these prior devices while widely accepted and used, in general, have required the use of metal throughout to provide the necessary strength for normal commercial use. Moreover, many of these prior devices, when clamped in position on a door flange have presented open spaces where rain and dirt may enter and rust and/or clog the operating mechanism thereof. Also, the presentation of these open spaces has provided places where rags and other materials used in cleaning an automobile may become adversely caught.

It is an object of the present invention to provide an improved clamp device for mounting accessories, so designed that the above disadvantages are overcome, and, particularly, so designed that material less strong, cheaper and easier to obtain than metal may be used instead of metal in certain portions of the clamp devices where heretofore very strong material such as metal was required to provide necessary support for the adjusting means of the clamp portions of the devices.

Another object of the invention is to provide a clamp device which despite the use of material less strong than metal in certain portions thereof, will not sacrifice essential strength and will have a long and effective life even under most severe operating conditions.

Other objects of the invention are to provide a clamp device and mounting: in which the parts thereof are effectively locked together against being surreptitiously removed or disassociated, particularly when the device is secured in operative position on the door flange of an automobile; in which there may be a wide range of adjustment of the accessory mounting and supporting portion of the device; in which an effective closure and seal is provided between the device and the outer face of the door flange when the device is clamped thereon; and which may be economically manufactured and applied with ease by a person desiring to use the same.

A feature of the invention, therefore, resides in the provision of a clamp device and mounting including an enclosing means or housing for the clamp adjusting or tightening mechanism, adapted to be clamped snugly relative to the outside of a door flange and which is so associated with the clamp adjusting means that no stress or strain is transmitted to it by the latter means.

Another feature of the invention resides in the provision of a clamp device and accessory mounting of the immediately foregoing character in which the support for the accessory is carried by a main clamping portion of the device and not by the enclosing means or housing.

Other features and advantages of the invention reside in the provision of: special means tending to prevent any adverse overtightening and resultant springing of the clamping portions of the device when the latter is being installed; very effective means for effecting a clamping adjustment of the device; means assuring an even and uniform application of the tightening force to the clamp; and means for preventing surreptitious removal of parts from the clamping device after it has been assembled.

Additional objects, features and advantages will hereinafter appear.

Figure 1:
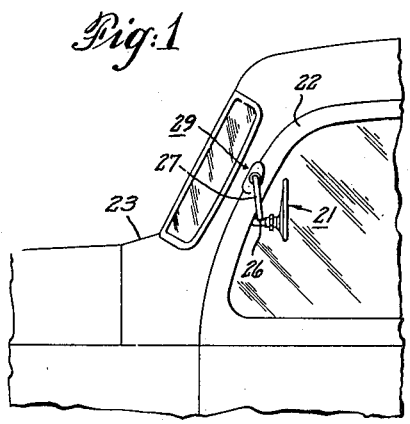
Figure 1 is a view showing a device embodying the invention, clamped to the door flange of an automobile.
Figure 4:
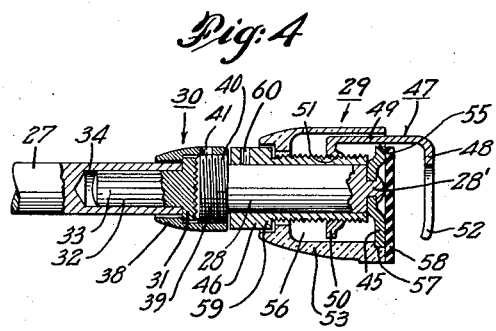
Fig. 4 is a cross-sectional view taken on the line 4—4 of Fig. 2.
Figure 2:
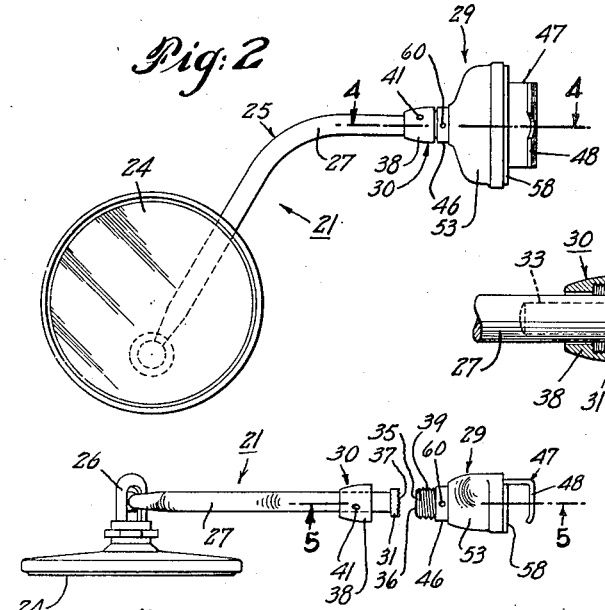
Fig. 2 is a front view of a preferred embodiment of the present invention.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring now in detail to the drawings, and first particularly to that form of the present invention shown in Figs. 1–10, it will be seen that an automobile appliance 21 is mounted upon a door flange 22 of a vehicle 23. A useful accessory such as a thermometer, a searchlight, and/or a directional signal may be included in the automobile appliance. In the form shown, a rear vision mirror 24 is included in the automobile appliance. Such a mirror may be mounted by means of a supporting arm 25. The supporting arm may be a single and continuous shaft if desired, or it may be a multipiece structure as shown.

Figure 9:
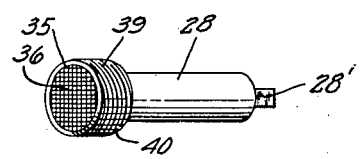
Figure 14:
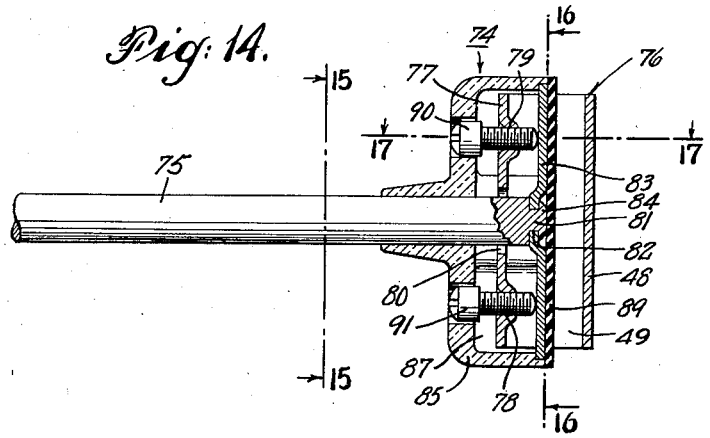
Fig. 14 is a view, similar to Fig. 11 but showing another modified form of the invention.
Figure 15:
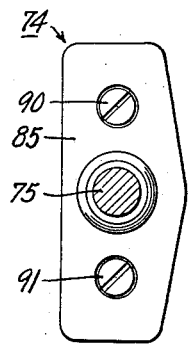
Fig. 15 is a view taken on the line 15—15 of Fig. 14.
Figure 16:
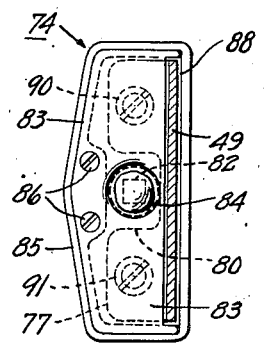
Fig. 16 is a sectional view taken on the line 16—16 of Fig. 14.
Figure 17:
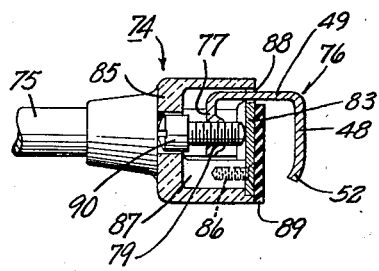
Fig. 17 is a sectional view taken on the line 17—17 of Fig. 14.

Preferably a ball and socket joint 26 of any well known and usual construction is interposed between the mirror 24 and an appliance shaft 27. A supporting pin 28, shown separately in Fig. 9, is provided with a noncircular riveting shank 28', by means of which it is associated with a clamping mechanism 29. The supporting pin advantageously may be connected to the appliance shaft by means of a dog-joint 30, best shown in Figs. 4 and 5. The supporting pin, dog-joint, appliance shaft, ball and socket joint, and/or other members connecting the clamping mechanism and appliance combine to form the supporting arm 25.

Figure 8:
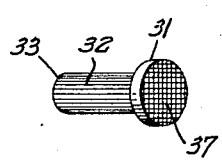

The dog-joint 30 includes a friction plate 31 shown separately in Fig. 8. Splines 32 on a stem 33 of the friction plate are adapted to engage a bore 34 in the appliance shaft to maintain the appliance shaft and friction plate in fixed relation. A friction face 35 on the supporting pin is provided with teeth 36 interengaging with teeth 37 on the friction plate in such a manner as to substantially prevent any relative arcuate movement between the supporting pin and appliance shaft so long as an internally shouldered and threaded sleeve 38 on the appliance shaft, by cooperation with a threaded portion 39 of the supporting pin, draws the teeth 36 and 37 into operative engagement. The threaded portion is preferably on a flange 40 of the supporting pin.

Figure 7:
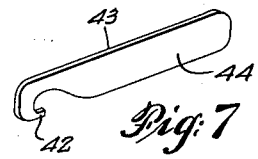
Fig. 7 is a perspective view of a wrench useful in installing the device shown in Figs. 1-6.
Figure 5:
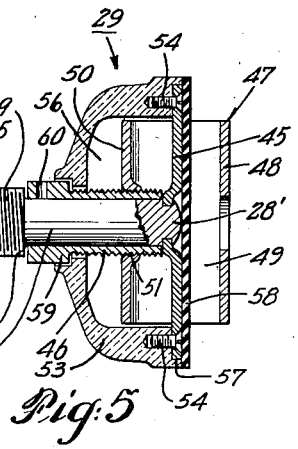
Fig. 5 is a cross-sectional view taken on the line 5—5 of Fig. 3.
Figure 3:
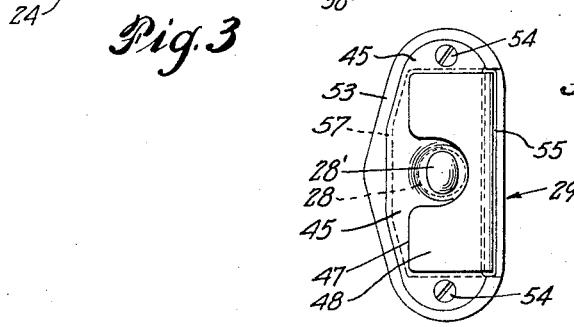
Fig. 3 is a side view of the device shown in Fig. 2, certain of the parts being in disconnected position.
Figure 6:
Fig. 6 is a bottom view of the clamp portion of the device shown in Fig. 2, with the cushioning pad removed.

To minimize the likelihood of overtightening the dog-joint and as can be seen in Figs. 2–5, the sleeve 38 is provided with a recess 41 suitable for receiving a hook 42 on a wrench 43 as shown in Fig. 7. It should be particularly noted that a handle 44 on the wrench is only of sufficient length as to permit the ordinary car owner to tighten together the sleeve and the supporting pin 28 a reasonable amount.

The clamping mechanism 29 provided by the present invention is particularly advantageous over clamping mechanisms heretofore available. A pressing plate constituting an outer jaw 45 is firmly secured to the supporting pin 28 at the end opposite the friction face 35. The noncircular riveting shank 28', as shown best in Figs. 4, 5 and 9, can be fitted in a corresponding opening in the outer jaw and peened down to unite the supporting pin and the outer jaw in fixed relation.

An adjusting member 46 is rotatably mounted on the supporting pin 28 and is maintained against adverse axial movement. The adjusting member is in the form of an externally threaded sleeve, and is preferably of such length as to fit between the flange 40 and the outer jaw 45 loosely enough to permit ready rotating movement but snugly enough to permit substantially no axial movement of the adjusting member upon the supporting pin.

Figure 10:
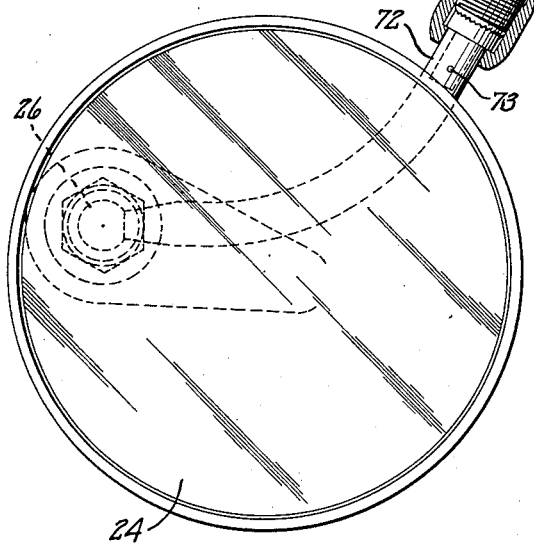
Figs. 8, 9 and 10 show details of the device illustrated in Figs. 1-6.
Figure 10:
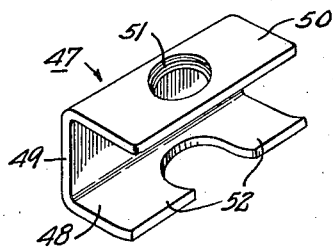

A substantially U- or yoke-shaped clamping member 47, shown separately in Fig. 10, is provided with an inner gripping jaw 48, a connecting section 49 and an outer or operating arm 50 having a threaded opening 51. The appliance 21 is ordinarily positioned on the vehicle 23 so that the inner jaw 48 grips the inner face of, and the outer jaw 45 presses toward the outer face of, the door flange. The inner jaw preferably is provided with a clawlike hook 52 directed toward the outer jaw 45. In assembled relation with the other elements of the device and as shown most clearly in Figs. 4 and 5 the U-shaped clamping member is positioned so that the outer jaw 45 is between the inner jaw 48 and the operating arm 50, while the externally threaded adjusting member 46 is in threaded engagement with the threaded opening 51 in the operating arm of the U-shaped clamping member.

In the operation of the clamp, the adjusting member 46 is moved arcuately. As the adjusting member is in threaded engagement with the operating arm 50, the operating arm is moved axially of the adjusting member. As the inner jaw 48 is in fixed relation with the operating arm, the axial movement of the latter provides axial movement of the inner gripping jaw. Inasmuch as the adjusting member is maintained against adverse axial movement and is positioned axially by the outer jaw 45, the arcuate movement of the adjusting member results in relative movement between the outer jaw and the inner jaw.

It should be noted that the present invention overcomes a defect of many of the prior devices which have, as pointed out hereinabove, presented open spaces where rain and dirt may enter and rust and/or clog the operating mechanism thereof. Also the presence of open spaces has provided places where rags and other materials used in cleaning an automobile have been adversely caught.

To the end of overcoming these defects, an enclosure or housing 53 is provided to extend outwardly from the outer jaw 45. The housing may be secured to the outer jaw by means of screws 54 passing through the outer jaw and engaging with portions near the opposite ends of the housing as shown best in Fig. 5. The outer jaw and housing define therebetween a slot or opening 55 in which the connecting section 49 of the clamping member 47 slideably moves during the relative adjustment of the jaws.

The housing 53 defines a chamber 56 having an open end over which the outer jaw 45 forms a closure which is substantially complete except for the slot 55 which is substantially closed by the connecting section of the clamping member, and except for a substantially conforming opening in the outer wall of the housing through which an operating head 59 of the sleevelike adjusting member extends. It is to be noted that the space between the adjusting member 46 and the housing is relatively small. Accordingly the chamber and the operating mechanism therein and especially the threadably interengaged adjusting member and the operating arm 50 are effectively protected against rain, dust, tar, and moisture. Moreover, the device, when clamped on a door flange, merges with and forms a unitary appearance with the door.

Attention is particularly directed to the fact that the housing 53 is not subjected to any of the strains which have heretofore ordinarily been placed upon housing for clamping mechanisms of the character here involved. The adjusting member 46 instead of being maintained against inward movement by the housing, is maintained against inward movement by the outer jaw 45. The supporting arm 25 instead of being secured to the housing is attached directly to the outer jaw 45. Moreover the adjusting member is positioned so that it places no strain upon, and preferably so that it does not even touch, the housing.

It should be particularly noted that because the housing 53 is so free from strained relation with other portions of the clamping mechanism, it is feasible to make the housing from materials less strong, cheaper and easier to obtain than metals. Structural macromolecular organic materials, generally known as plastics, are particularly well adapted for this purpose. For example, the housing may be made of Lucite (methylmethacrolate), Saran (polyvinylidenechloride), Bakelite (phenol-formaldehyde), Celluloid, or other suitable plastic. In addition to avoiding the disadvantages of metals, such as difficulty of procurement, expense of fabrication, etc. the plastic housing of strainless structural design provides a streamlined appearance and ornamental effect not easily attained by the use of metals. Moreover, the plastic housing can be the same color as the vehicle on which it is mounted, or in such other color as may be desired.

The walls defining the initially open end of the housing preferably are provided with shouldered recesses 57 for accommodating the outer jaw on all edges except the one adjacent the slot 55. A pad 58 of rubber, fabric, or the like may be secured to the outer jaw to cushion the latter and prevent any adverse scratching of the outer face of the door flange 22 thereby.

It has been found that when adjusting members are provided with conventional shapes such as square, hexagonal, or like shapes, then wrenches are sometimes used thereon in such a manner as to tighten the clamping mechanism so much as to spring the clamp and make it unsatisfactory for replacement purposes. Although the hook 52 is designed to decrease the likelihood of and any adverse effect of such springing of the clamp, there may be provided, according to the present invention, special means to minimize the likelihood of overtightening the clamping mechanism. Thus, the operating head 59 may be provided with an external surface not susceptible of being readily gripped by ordinary open end wrenches suitable for square and hexagonal surfaces. If it is desired to also minimize the likelihood of a pipe wrench or the like being used upon the clamping mechanism, the space between the housing and the sleeve 38 may be relatively small, as shown best in Fig. 4. Particularly satisfactory results are achieved by the use, as shown, of an operating head in the form of a circular flange having a recess 60 therein suitable for receiving the hook 42 of the wrench 43. It should be particularly noted that the advantageous tightening means for the clamping mechanism cooperates with the hook 52 which also tends to prevent a springing of the clamp.

Accordingly, it is seen that there is provided by the present invention a novel clamp and mounting device which may be readily associated with a vehicle door flange, for example, by merely locating the device with the flange between the gripping jaw 48 and the outer jaw 45 and then operating the adjusting member 46 exteriorly of the housing to draw the gripping jaw relatively to the outer jaw to effectively clamp the device in position with the housing and outer jaw forming a snug fit with and presenting a streamlined and merging appearance with the outer face of the door flange. And, of importance, all of these advantages are achieved in a device in which no appreciable strain is placed on the housing 53 serving as a part of the base of the device. Moreover, it is seen that the adjusting member, by virtue of the action of the inwardly facing shoulder provided by the flange 40, is maintained against axial movement out of the chamber 56. This serves to further integrate the elements constituting the operating parts of the clamp operating means and to prevent the surreptitious removal or inadvertent displacement thereof after the device has been assembled.

Figure 12:
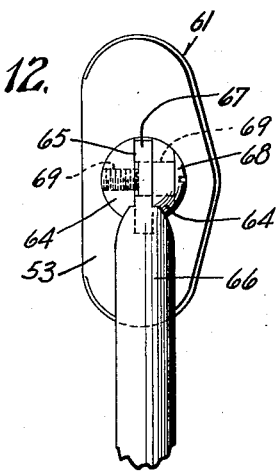
Fig. 12 is a view looking in the direction of the arrow in Fig. 11.
Figure 11:
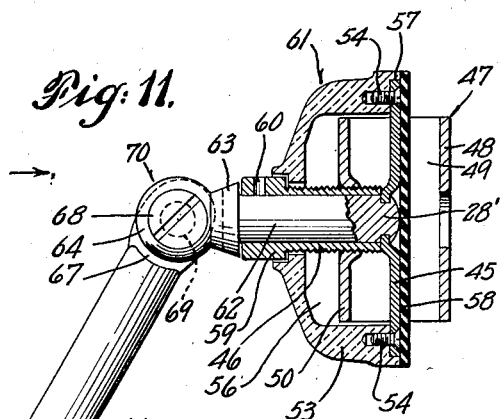
Fig. 11 is a view, similar to Fig. 5, but illustrating a modified form of the invention.
Figure 13:
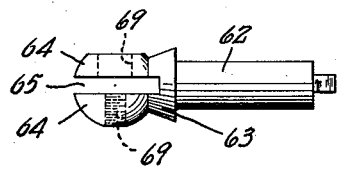
Fig. 13 is a view showing a detail of the device illustrated in Figs. 11 and 12.

The modified form of the invention shown in Figs. 11–13 is substantially the same as the form shown in Figs. 1–10 and differs therefrom in only the following particulars. A clamping mechanism 61 differs from the clamping mechanism 29 in that the former includes a supporting pin 62 which has, instead of a friction face, an enlarged portion 63 having two ears 64 extending therefrom to define a slot 65. A connecting shaft 66 is provided with a flattened extension 67 fitting into the slot. A suitable pintle 68 in coaxial holes 69 in the ears and extension cooperates therewith to form a hinged joint 70 between the connecting shaft and the supporting pin. The pintle may be in threaded engagement with one of the ears or maintained in position by other suitable means.

A dog-joint 71 which is exactly the same as the dog-joint 30 is adapted to associate the connecting shaft 66 with an appliance shaft 72. A pin 73 may be used to further secure the stem 33 in the bore 34 of the appliance shaft 72. It should be particularly noted that the mirror 24 is movable relative to the supporting pin 62 by means of any or all of the three joints, the hinge joint 70, the dog-joint 71 and/or the ball and socket joint 26.

Figure 18:
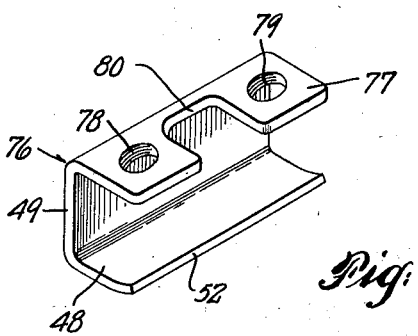
Fig. 18 is a perspective view of a clamping member of the device shown in Figs. 14–17.

The alternative form of the invention shown in Figs 14–18 is substantially the same as the forms previously described excepting that it includes a plurality of adjusting members 90 and 91 in the form of screws with slotted heads therein, instead of a single adjusting member. A clamping mechanism 74 is adapted to mount a supporting arm 75 upon a vehicle. As shown in Fig. 18 there is provided a yoke-shaped clamping member 76 having the inner gripping jaw 48, the hook 52, and the connecting section 49 described hereinabove. However, an outer or operating arm 77 of the yoke-shaped member is provided with two threaded openings 78 and 79 for the adjusting members and an unthreaded central opening 80 for the supporting arm. The supporting arm 75, like the supporting pin 28, is provided with a noncircular riveting shank 81 extending through a noncircular opening 82 in an outer jaw 83 to which it is secured by a peened-over portion 84.

As in the case of the forms previously described, the clamping mechanism 74 is provided with a housing 85 which effectively excludes dust, dirt, and rain from the interengaging threaded portions, the housing being so associated with the adjusting members and the supporting arm that these elements transmit no strain thereto. Screws 86 secure a boss formed in the housing to the central portion of the outer jaw 83, which jaw forms a closure for a chamber 87, similar to the chamber 56, having an opening or slot 88 which is substantially closed by the connecting section 49 of the clamping member 76. A cushioning pad 89, similar to the pad 58, preferably is provided on the outer jaw.

The adjusting members 90 and 91 are in threaded engagement with the threaded openings 78 and 79, and, similarly to the adjusting member 46 in the forms previously described, are limited in axial movement in one direction by the outer jaw 83, and the operating heads thereof extend into and are associated with openings in the outer wall of the housing in such a way that no strain is placed on the latter when the clamp is adjusted. As explained in connection with the clamping mechanism 29, arcuate movement of the adjusting members provides relative movement between the inner jaw and the outer jaw to make it possible to secure the clamping mechanism 74 to the door flange 22 of the vehicle 23.

It should be particularly noted that the housing is not subjected to any strains, either by the supporting arm or by the adjusting members. Accordingly, as in the other forms described, it is feasible to make the housing of a plastic, thus avoiding the difficulty of procuring metal and avoiding the expense of fabricating the housing of metal. Moreover the plastic housing possesses other advantages as pointed out hereinabove.

Variations and modifications may be made within the scope of this invention and portions of the improvements may be used without others.

Having thus described the invention, what is claimed as new is:

1. In a device of the character described, the combination of a yoke-shaped clamping member having opposed inner and outer arms, said inner arm constituting an inner gripping jaw and said outer arm constituting an operating arm; a pressing member having an outer and an inner side, intermediate said operating arm and said inner gripping jaw; enclosing means connected to and extending outwardly from said pressing member and forming with the latter a housing for said operating arm; supporting means carried by and extending outwardly from the outer side of said pressing member through said chamber and enclosing means; and adjusting means cooperable with said operating arm and said pressing member for drawing the gripping jaw towards and into gripping relationship with the inner side of said pressing member.

2. In a device of the character described, the combination of a yoke-shaped clamping member having opposed inner and outer arms, said inner arm constituting an inner gripping jaw and said outer arm constituting an operating arm; a pressing member having an outer and an inner side, intermediate said operating arm and said inner gripping jaw; enclosing means connected to and extending outwardly from said pressing member and forming with the latter a housing for said operating arm; supporting means carried by and extending outwardly from the outer side of said pressing member through said chamber and enclosing means; adjusting means accessible from outside said chamber, threadedly engageable with said operating arm and cooperable with said pressing member for drawing the gripping jaw towards the inner side of said pressing member; and means for arresting movement of said adjusting means outwardly relative to said chamber.

3. In a device of the character described, the combination of a yoke-shaped clamping member having opposed inner and outer arms, said inner arm constituting an inner gripping jaw and said outer arm constituting an operating arm; a pressing member having an outer and an inner side, intermediate said operating arm and said gripping jaw; enclosing means connected to and extending outwardly from said pressing member and forming with the latter a housing for said operating arm; supporting means carried by and extending outwardly from the outer side of said pressing member through said chamber and enclosing means; and an exteriorly threaded sleevelike member on said supporting means, in threaded engagement with said operating arm and cooperable with said pressing member for drawing said gripping jaw toward the latter.

4. In a mounting for associating an appliance with a door flange of a vehicle, the combination of an outer jaw; a housing extending outwardly from and attached to the outer jaw and defining therewith a chamber; a supporting arm attached to the outer jaw and extending outwardly through the housing; at least one adjusting member at least partly within the chamber and maintained against adverse inward axial movement relative to the housing by the outer jaw; and a yoke-shaped clamping member having opposed inner and outer arms in straddling relation with respect to said outer jaw, said inner arm constituting an inner gripping jaw opposed to said outer jaw and said outer arm constituting an operating arm, said operating arm being located in said chamber and operatively associated with said adjusting member in said chamber for movement of said clamping member to draw the inner jaw thereof towards said outer jaw.

5. In a mounting for associating an appliance with a door flange of a vehicle, the combination of an outer jaw; a housing of plastic material extending outwardly from and attached to the outer jaw and defining therewith a chamber; a supporting arm attached to the outer jaw and extending outwardly through the housing; adjusting means at least partly within the chamber and positioned against adverse inward axial movement by the outer jaw; and a yoke-shaped clamping member having opposed inner and outer arms in straddling relation with respect to said outer jaw, said inner arm constituting an inner gripping jaw opposed to said outer jaw and said outer arm constituting an operating arm, said operating arm being located in said chamber and in threaded association with said adjusting means in said chamber for movement of said clamping member to draw the inner jaw thereof towards said outer jaw.

6. In a mounting for associating an appliance with a door flange of a vehicle, the combination of an outer jaw; a housing extending outwardly from and attached to the outer jaw and defining therewith a chamber; a supporting pin attached to the outer jaw and extending outwardly through the housing; an appliance shaft; integral means on the supporting pin for disengageably joining the supporting pin to the appliance shaft; an adjusting member at least partly within the chamber and maintained against any substantial axial movement in either direction; and a yoke-shaped clamping member having opposed inner and outer arms in straddling relation with respect to said outer jaw, said inner arm constituting an inner gripping jaw opposed to said outer jaw and said outer arm constituting an operating arm, said operating arm being located in said chamber and operatively associated with said adjusting member in said chamber for movement of said clamping member to draw the inner jaw thereof towards said outer jaw.

7. In a mounting for associating an appliance with a door flange of a vehicle, the combination of an outer jaw; a nonmetallic housing extending outwardly from and attached to the outer jaw and defining therewith a chamber; a supporting pin attached to the outer jaw and extending outwardly through the housing; an appliance shaft; integral means on the supporting pin for disengageably joining the supporting pin to the appliance shaft; a threaded adjusting member maintained against any substantial axial movement in either direction; and a yoke-shaped clamping member having opposed inner and outer arms in straddling relation with respect to said outer jaw, said inner arm constituting an inner gripping jaw opposed to said outer jaw and said outer arm constituting an operating arm, said operating arm being located in said chamber and in threaded association with said adjusting member in said chamber for movement of said clamping member to draw the inner jaw thereof towards said outer jaw.

8. In a mounting for associating an appliance with a door flange of a vehicle, the combination of an outer jaw; a housing extending outwardly from and attached to the outer jaw and defining therewith a chamber; a supporting pin attached to the outer jaw and extending outwardly through the housing; an enlarged portion on the supporting pin; a threaded sleeve rotatably mounted on the supporting pin, maintained against inward axial movement by the outer jaw and against outward axial movement by the enlarged portion; and a yoke-shaped clamping member having opposed inner and outer arms in straddling relation with respect to said outer jaw, said inner arm constituting an inner gripping jaw opposed to said outer jaw, and said outer arm constituting an operating arm, said operating arm being located in said chamber and in threaded association with said threaded sleeve in said chamber for movement of said clamping member to draw the inner jaw thereof towards said outer jaw.

9. In a mounting for associating an appliance with a door flange of a vehicle, the combination of an outer jaw; a housing extending outwardly from and attached to the outer jaw and defining therewith a chamber; a supporting pin attached to the outer jaw and extending outwardly through the housing; an enlarged portion on the supporting pin; an appliance shaft; integral means on the enlarged portion for disengageably joining the supporting pin to the appliance shaft; a threaded sleeve rotatably mounted on the supporting pin, maintained against inward axial movement by the outer jaw and against outward axial movement by the enlarged portion; and a yoke-shaped clamping member having opposed inner and outer arms in straddling relation with respect to said outer jaw, said inner arm constituting an inner gripping jaw opposed to said outer jaw, and said outer arm constituting an operating arm, said operating arm being located in said chamber and in threaded association with said threaded sleeve in said chamber for movement of said clamping member to draw the inner jaw thereof towards said outer jaw.

10. In a mounting for associating an appliance with a door flange of a vehicle, the combination of an outer jaw; a housing extending outwardly from and attached to the outer jaw and defining therewith a chamber; a supporting pin attached to the outer jaw and extending outwardly through the housing; an enlarged portion on the supporting pin; a friction face on the enlarged portion; an appliance shaft; a friction face on the appliance shaft; means for drawing together and maintaining together the friction faces to normally form a tight dog joint preventing relative arcuate movement between the supporting pin and appliance shaft; a threaded sleeve rotatably mounted on the supporting pin, maintained against inward axial movement by the outer jaw and against outward axial movement by the enlarged portion; and a yoke-shaped clamping member having opposed inner and outer arms in straddling relation with respect to said outer jaw, said inner arm constituting an inner gripping jaw opposed to said outer jaw, and said outer arm constituting an operating arm, said operating arm being located in said chamber and in threaded association with said threaded sleeve in said chamber for movement of said clamping member to draw the inner jaw thereof towards said outer jaw.

11. In a mounting for associating an appliance with a door flange of a vehicle, the combination of an outer jaw; a housing extending outwardly from and attached to the outer jaw and defining therewith a chamber; a supporting pin attached to the outer jaw and extending outwardly through the housing; an enlarged portion on the supporting pin; a pair of slot-defining ears extending from the enlarged portion; an appliance-supporting extension pivoted in the slot to form a hinged joint; a threaded sleeve rotatably mounted on the supporting pin, maintained against inward axial movement by the outer jaw and against outward axial movement by the enlarged portion; an outer arm in the chamber and in threaded engagement with the sleeve; an inner jaw opposed to and in gripping relation with the outer jaw; and a connecting section combining with the inner jaw and outer arm to form a substantially U-shaped member.

12. In a mounting for associating an appliance with a door flange of a vehicle, the combination of an outer jaw; a housing extending outwardly from and attached to the outer jaw and defining therewith a chamber; a supporting arm attached to the outer jaw and extending outwardly through the housing; at least two adjusting screw members maintained against inward axial movement by the outer jaw; and a yoke-shaped clamping member having opposed inner and outer arms in straddling relation with respect to said outer jaw, said inner arm constituting an inner gripping jaw opposed to said outer jaw and said outer arm constituting an operating arm, said operating arm being located in said chamber and actuated by said adjusting members in said chamber for movement of said clamping member to draw the inner gripping jaw thereof towards said outer jaw.

13. In a device of the character described, the combination of a pressing member constituting an outer jaw; a housing member extending outwardly from and attached to said pressing member and defining therewith a chamber; a yoke-shaped clamping member having opposed inner and outer arms, straddling said pressing member, said outer arm being located inside said chamber and said inner arm being located outside said chamber and constituting an inner jaw in opposed relation to said outer jaw constituted by said pressing member; and adjusting screw means, including a rotatable member extending outwardly through said outer arm in said chamber and being accessible exteriorly of said chamber, operatively associated with and interposed between said outer arm and said pressing member in said chamber to subject said outer arm and pressing member to opposed forces serving to draw said inner jaw relative to said outer jaw when said rotatable member is rotated.

14. In a device of the character described for mounting a vehicle accessory, the combination of a substantially yoke-shaped clamping member having opposed inner and outer arms, said inner arm constituting an inner gripping jaw; a pressing member located intermediate said inner and outer arms and constituting an outer jaw opposed to said inner gripping jaw constituted by said inner arm; a housing member having an open inner end, secured to said pressing member, said pressing member being disposed at said open inner end and defining with said housing a chamber in which said outer arm is located; an accessory supporting arm, carried by said pressing member and extending outwardly therefrom through said chamber and beyond said housing member; and at least one adjusting screw member, accessible from outside said chamber, having a main operating portion located in said chamber in threaded relation with said outer arm and having a pressing reaction inwardly against said pressing member for drawing said inner arm towards and into object clamping relationship with respect to said pressing member.

15. In a device of the character described for mounting a vehicle accessory, the combination of a substantially yoke-shaped clamping member having opposed inner and outer arms, said inner arm constituting an inner gripping jaw; a pressing member located intermediate said inner and outer arms and constituting an outer jaw opposed to said inner gripping jaw constituted by said inner arm; a housing member having an open inner end, secured to said pressing member, said pressing member being disposed at said open inner end and defining with said housing a chamber in which said outer arm is located; an accessory supporting arm, carried by said pressing member and extending outwardly therefrom through said chamber and beyond said housing member; at least one adjusting screw member, accessible from outside said chamber, having a main operating portion located in said chamber in threaded relation with said outer arm and having a pressing reaction inwardly against said pressing member for drawing said inner arm towards and into object clamping relationship with respect to said pressing member; and means for arresting said adjusting screw member against movement axially outward relative to said housing member and maintaining the main operating portion in threaded relation with said outer arm in said chamber.

DANIEL E. REED.